United States Patent [19]

Markin et al.

[11] 4,117,209
[45] Sep. 26, 1978

[54] ELECTROCHEMICAL CELLS

[75] Inventors: Trevor Leslie Markin, Goring-on-Thames; Roger John Bones, Abingdon; Keith Taylor Scott, Newbury; Geoffrey John May, Frodsham; Graham Robinson, Tarvin, all of England

[73] Assignee: Chloride Silent Power Limited, London, England

[21] Appl. No.: 853,596

[22] Filed: Nov. 21, 1977

[30] Foreign Application Priority Data

Nov. 22, 1976 [GB] United Kingdom ............... 48656/76

[51] Int. Cl.² .......................................... H01M 10/39
[52] U.S. Cl. ..................................... 429/104; 429/191
[58] Field of Search ................. 429/104, 163, 31, 185, 429/209, 191, 193, 103

[56] References Cited

U.S. PATENT DOCUMENTS

| | | | |
|---|---|---|---|
| 3,413,150 | 11/1968 | Kummer et al. | 429/104 X |
| 3,749,603 | 7/1973 | Stringham et al. | 429/104 |
| 4,048,391 | 9/1977 | Tilley et al. | 429/104 |
| 4,061,840 | 12/1977 | Jones et al. | 429/104 |

Primary Examiner—Anthony Skapars
Attorney, Agent, or Firm—Beveridge, DeGrandi, Kline & Lunsford

[57] ABSTRACT

In a sodium-sulphur cell having a solid electrolyte separating sodium from a cathodic region containing sulphur/polysulphides in a graphite felt, a cathode current collector is formed of an aluminium substrate on which is an interstrate layer of nickel-chromium alloy covered by a coating of titanium oxide or other electronically conductive oxide intrinsically inert to the cathodic reactant.

20 Claims, 4 Drawing Figures

ELECTROCHEMICAL CELLS

BACKGROUND OF THE INVENTION

1. Field of the Invention

This invention relates to electrochemical cells and is concerned more particularly with current collectors for such cells.

Many types of electrochemical cells contain materials which chemically are highly reactive or corrosive. In cells which employ a solid conducting membrane consituting the electrolyte and separating anodic and cathodic materials which are fluids, current collectors have to be provided to effect electronic current connection with the anodic and cathodic reagents. Corrosion of such current collectors is a problem if either or both the anodic and cathodic materials are highly reactive.

The present invention is concerned more particularly with sodium-sulphur cells. In such a cell, molten sodium is separated by a conductive membrane, usually beta-alumina, from a molten sulphur/sodium polysulphides mixture constituting the cathodic reactant. The sulphur/polysulphides is not only very corrosive, but it also has low electronic conductivity. Few materials with high electronic conductivity are stable in this cathodic environment. The sulphur/polysulphides material has a low electronic conductivity and, to improve this, it is the common practice to pack carbon or graphite felt in the cathodic region between the surface of the electrolyte and the surface of a cathode current collector. The distance between the current collector and the electrolyte surface is made as short as possible consistent with providing sufficient volume of cathodic reactant. For this reason, it is convenient to make the cell tubular with the electrolyte in the form of a tube having the cathodic reagent inside the tube and the current collector comprising a rod located in and extending along the tube. The graphite felt, although not having a high conductivity, does provide adequate conductivity over the short distance between the electrolyte material and the current collector. The current collector rod, which must be in multiple contact with the felt along the length of the cathodic region, has to provide a low resistance path to an output terminal. This rod however is exposed to the cathodic reactant and must be chemically inert with respect to the sulphur/polysulphides.

2. Prior Art

It has been proposed to use, as such a current collector, an impermeable graphite tube containing metal to give adequate longitudinal conductivity along the length of the rod. With such arrangements, however, one of the problems is to make good contact between the graphite tube and the metal core. This can be achieved by a deformable interface between the graphite tube and the core, as described for example, in United States Specification No. 3,982,957. This leads to a complex construction.

In cells where the sodium is inside the electrolyte tube and the cathodic reactant outside the electrolyte (known as central sodium cells) the problem is even more serious since the outer housing is used as the cathode current collector; any failure of this housing leads to leakage of the cathodic reactant. The direct application of a protective coating to a substrate of good conductivity might appear to be a solution to this problem but, although a number of such arrangements have been proposed, they have all had serious drawbacks. It has been proposed for example to use a stainless steel housing with a protective coating of molybdenum or carbon. It is difficult however to obtain satisfactory protective coatings of these materials. In such a construction, the integrity of the cell is dependent on the coating giving complete protective for the stainless steel. Many other ideas have been proposed. For example, U.S. Pat. No. 3,413,150 proposes the use of aluminum with a coating of chromium or titanium or chromel (a nickel-chromium alloy), such coatings being applied by electroplating or the decomposition of metal salts or vacuum deposition. Considerable difficulties have been met in attempting to put such ideas into practice, and it is still the common practice to use carbon or graphite in spite of its poor electrical conductivity. It is now well-known for example that titanium will rapidly corrode when used in the cathode electrode of a sodium-sulphur cell. Chromium and nickel-chromium alloys have not been found satisfactory as a cathode current collector because of problems with electronic exchange between the electronically conductive member and the electrode, resulting in only mediocre utilisation of polysulphide material. A chromium sulphide $Cr_2S_3$ layer forms on chromium or chromium alloys in the cathodic reactant. Prior to cell operation however, a corrosion-resistant film of chromium oxide $Cr_2O_3$ tends to form on chromium or chromium alloys; this is an electronic insulator and so leads to an increase in cell impedance.

SUMMARY OF THE INVENTION

It is one of the objects of the present invention to provide an improved form of cathode current collector for use in sodium-sulphur cells.

According to the present invention, in a sodium-sulphur cell having a solid electrolyte separating sodium forming the anode from a cathodic reactant comprising sulphur/polysulphides, there is provided a cathode current collector comprising an aluminum substrate with, over the surface of the substrate exposed to the cathodic reactant, an interstrate layer of a nickel-chromium alloy as hereinafter defined, and an outer coating over the interstrate layer of a plasma-sprayed or detonation-gun sprayed electronically conductive oxide inert with respect to the cathodic reactant.

Plasma-spraying techniques using a plasma-arc gun are well-known. For applying the oxide coating, it is possible to use plasma-spraying or a detonation gun (D-gun) coating process. This latter process operates by metering oxygen, acetylene and coating material into a firing chamber. There are detonated by a spark to produce a hot (3300° C), high speed 750 m/s gas stream which forces the particles against the substrate. The advantages of the process are the good quality of the bond between coating and substrate and the ability to keep the substrate relatively cool (<150° C) which avoids distortion or metallurgical changes. Plasma-spraying by contrast has a higher temperature (~17000° C) but lower particle velocities.

The nickel-chromium alloy may be a binary alloy of nickel or chromium but, more generally, it is an alloy containing at least 50% by weight of nickel and chromium together, each of these components comprising at least 10% by weight of the material, the major constituents, if any, apart from nickel and chromium, being iron and/or cobalt and possibly with minor proportions of one or more of the following materials; molybdenum, tungsten, niobium, aluminium, titanium, manganese, carbon and yttrium, the minor constituents totalling not more than 5% by weight. Such an alloy is referred to below as an alloy as hereinbefore defined.

The cathode current collector of the present invention makes use of an interstrate layer of such a nickel-chromium alloy. Such a layer may readily be deposited by a number of known techniques. This alloy, if applied by a plasma spray, would be above the melting point of the constituents and hence is applied in a liquid state giving a good covering over the aluminium substrate. The outer coating is of a conductive oxide, e.g. titanium oxide, which is applied by plasma spraying. Plasma spraying permits of the temperature of the substrate being controlled to give the best adherence of the coating. Plasma spraying also produces, by impact of the particles, a unique microstructure, which favours adherence during thermal cycling. Other coating techniques, e.g. vacuum coating processes or electrochemical methods, may be more convenient. Such techniques are well-known for the deposition of nickel chromium alloys in the electronics industry.

The material sprayed may be pure titanium oxide when the conductive properties are produced during the plasma-spraying process, or it may be titanium oxide doped with a metal ion having a valency of 5, e.g. tantalum or niobium, to stabilise the material against oxidation and in this case the conductive properties of the plasma-sprayed deposit are improved. Typically 1% by weight of niobium might be employed; theoretically much smaller quantities should be effective but would require a very well mixed powder. Niobium or tantalum-doped material with suitable chemical and rheological properties for plasma spraying may be produced by a sol-gel process or by wet grinding followed by spray drying. The outer coating forms a protective coating, which by reason of the plasma spraying is in good electronic contact with the interstrate layer. The interstrate layer, in itself, however also forms a protection against any corrosion of the aluminium.

Other conductive oxide materials which may be used for the outer coating are strontium-doped lanthanum chromite, strontium titanate, lanthanum cobaltite, iron-doped calcium titanate or a mixture of aluminum oxide and titanium dioxide (a proprietary aluminium oxide/titanium dioxide mixture is sold by Union Carbide, which is reputedly a more impervious coating than pure titania). There may be applied by plasma-gun spraying to give an electronically conductive coating completely covering the interstrate material.

The conductive oxide coating may be quite thin and hence give very little electrical resistance in the direction through its thickness. If applied over a material of high electronic conductivity, it enables a current connection of low resistance to be made to the electrode material in the cell.

The substrate material therefore should preferably have a high conductivity. It is convenient to use a substrate material with a relatively low density. If a very thin coating is used, it is preferable that the substrate material should have a relatively low corrosion rate with respect to the ambient conditions in the cell. Aluminium fulfils these requirements for the substrate material.

Sodium-sulphur cells have to be operated at a temperature above ambient temperature and hence the cell is subjected to thermal cycling. Differences in the coefficient of thermal expansion of the protective coating and the substrate in a cathode collector may give rise to a tendency for degradation of the integrity of the coating on thermal cycling to occur. This problem is overcome or substantially alleviated by the use of the interstrate layer of nickel-chromium alloy material between the conductive oxide and the aluminium substrate. The interstrate layer has a coefficient of expansion matching that of the oxide coating.

For many types of cells, in particular central sulphur cells, a current collector which is to extend into a liquid cathodic reactant material may be in the form of an aluminium rod or tube with the conductive oxide coating over the interstrate on the external surface. Such an arrangement may be used for example in a sodium-sulphur cell of the kind in which the cathodic reactant is contained within a beta-alumina electrolyte tube and in which the sodium, constituting the anode material, is on the outside of the electrolyte tube. Such a current collector rod may be convoluted or grooved or otherwise shaped to provide an extended surface so as to increase the contact area with the electrode material. In some cases however it may be convenient to utilise, as a current collector, a perforated tube or a cage construction or an open-ended tube coated with the conductive oxide and interstrate on the inside and on the outside. Such an open-ended tube arrangement may be convenient in a cell in which the interior of the tube forms an expansion chamber, or a path to an expansion chamber, to accommodate changes in the electrode volume as a result of the electrochemical reactions.

In other types of cell, it may be convenient to make the current collector in the form of an aluminium tube or housing with the interstrate layer and conductive oxide coating on the internal surface of this tube or housing. Such an arrangement may be used for example in a sodium-sulphur cell of the central sodium type in which the cathodic reactant is around the outer surface of an electrolyte tube with the sodium on the inner surface, the cathodic reactant being contained within an outer current collector tube, possibly forming the outer housing of the cell; such a current collector tube may be coated with interstrate layer and conductive oxide on its internal surface.

DESCRIPTION OF THE PREFERRED EMBODIMENTS

Figure 1:
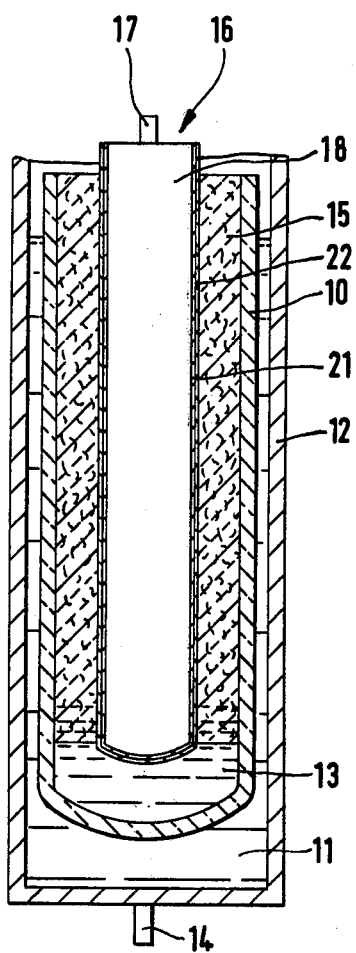
FIG. 1 is a diagrammatic longitudinal section through a sodium-sulphur cell forming one embodiment of the invention.

In FIG. 1 there is shown a sodium-sulphur cell having a solid electrolyte tube 10 of beta-alumina separating molten sodium 11 within a steel housing 12 from a cathodic reactant 13 comprising sulphur and sodium polysulphides located within the electrolyte tube 10. The sodium forms the anode of the cell and electrical connection thereto is effected via terminal 14 on the housing 12. To provide a cathode current path, the cathodic region contains a graphite felt 15 lying between the inner surface of the tube 10 and a current collector rod 16 leading to a terminal 17.

The present invention is concerned more particularly with such a current collector. The current collector rod 16, in the embodiment illustrated, is formed of an aluminium core 18 which is coated with an interstrate layer of nichrome alloy 21 (of 80% Ni 20% Cr by weight) over which is a titanium oxide coating 22. The interstrate layer is applied by plasma spraying and covers the whole of the part of the core 18 exposed to the sulphur/polysulphides constituting the cathodic reactant. Conveniently the whole of the core within the cell is so coated. This titanium oxide coating is also applied by plasma spraying and, in the particular embodiment illustrated, is formed of titanium dioxide doped with 1% by weight of niobium. The oxide coating completely covers the interstrate layer.

Figure 2:
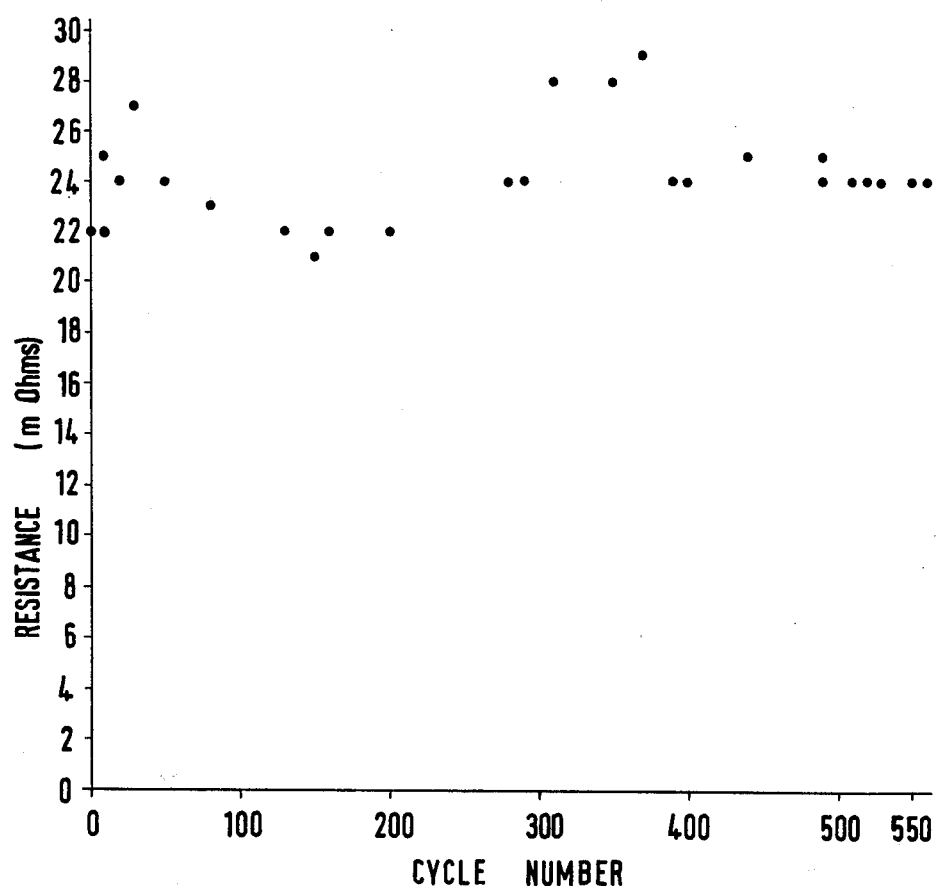
FIG. 2 is a graphical diagram showing the variation of cell resistance of a sodium-sulphur cell having a cathode current collector in accordance with the present invention.

FIG. 2 is a graphical diagram showing the variation of cell resistance (of a cell as described above with reference to FIG. 1) plotted as ordinate as the cell is repeatedly charged and discharged cyclically. The cell was discharged to an open circuit potential of 1.76 volts at about the 5 hour rate (i.e. this discharge takes about 5 hours) and was recharged at a constant voltage of 2.8 volts through a current limiting resistor. It will be seen that the cell resistance remained substantially constant at about 24 milliohms for 560 operating cycles.

Figure 3:
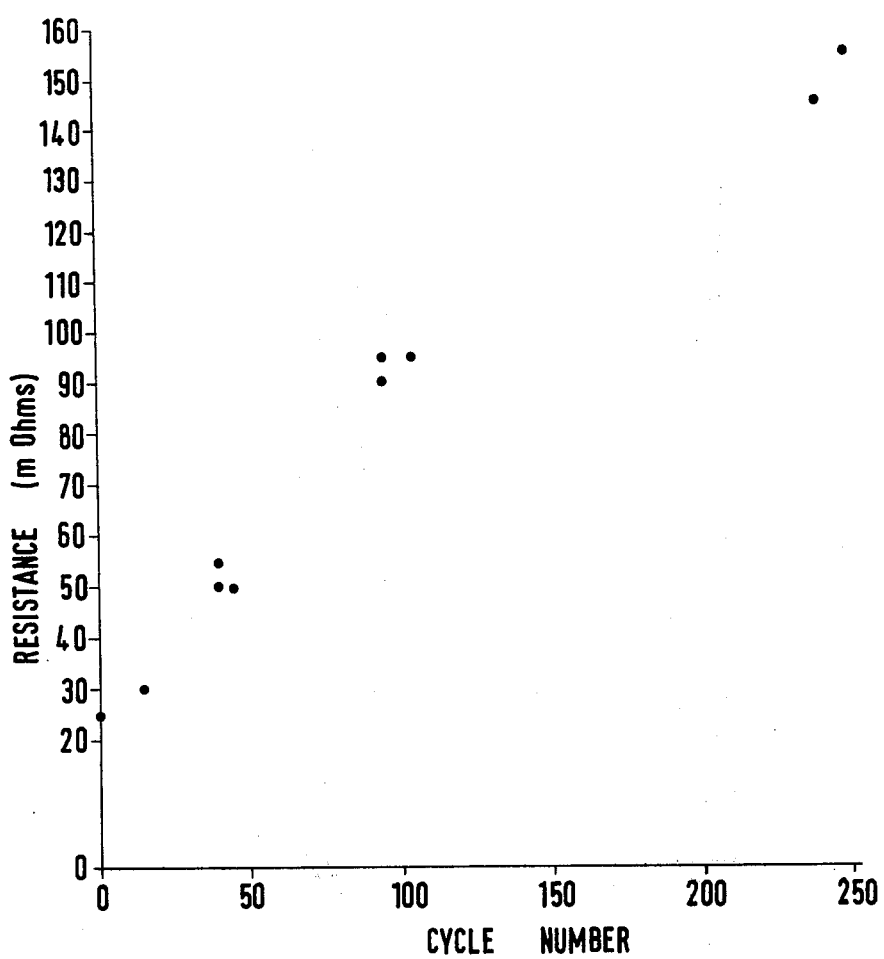
FIGS. 3 and 4 are diagrams similar to FIG. 2 but showing, for comparison purposes, results obtained with other types of cell.
Figure 4:
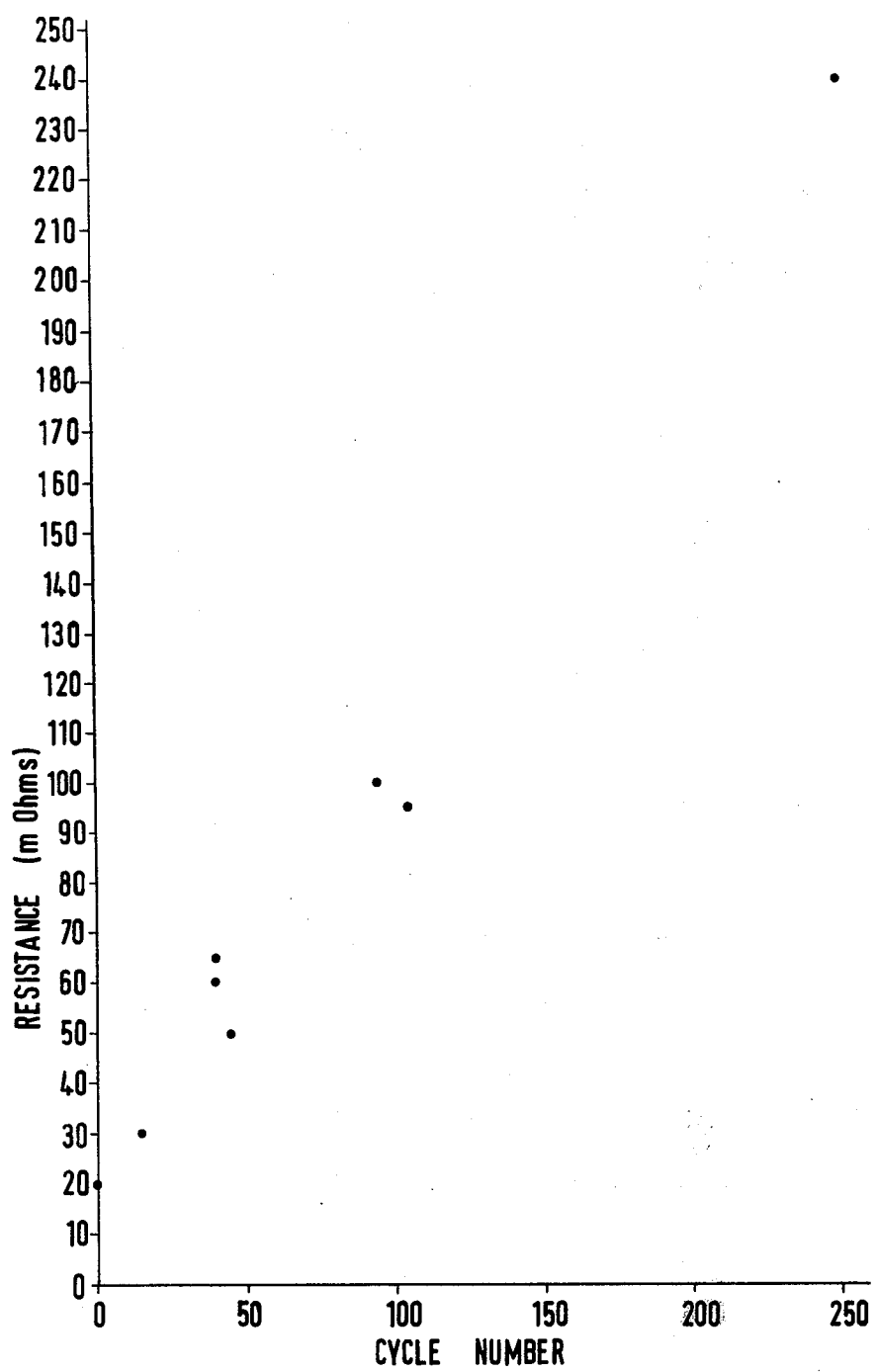

For comparison purposes, FIGS. 3 and 4 illustrate the variation of cell resistance for similar tests on cells similar to that of FIG. 1 except that the cathode current collectors were not made in accordance with the present invention.

In FIG. 3, the current collector comprised an aluminium rod which was plasma-sprayed with molybdenum to form an interstrate layer (instead of the nickel-chromium alloy), the outer coating being of niobium-doped titanium oxide similar to the outer coating of the test of FIG. 2. It will be seen that the cell resistance started at 25 m ohm (about the same as in FIG. 2) but rapidly increased and had reached 160 m ohm after 250 cycles when the test was discontinued.

In FIG. 4, the aluminium core of the cathode current collector was directly coated with niobium-doped titanium oxide without any interstrate layer. Although the cell resistance was initially only 20 m ohm, it rapidly increased and reached 100 m ohm after 95 cycles.

These test results illustrate the importance of having the nickel-chromium interstrate layer. Although the oxide coating gives protective against corrosion, the interstrate layer ensures that the low electrical resistance is maintained over prolonged charge/discharge cycling of the cell. The oxide coating, on the other hand, protects the nickel-chromium layer from the corrosion that would occur if such a material were exposed directly to the cathodic reactant and used as a current collector. It also prevents the formation of any insulating oxide film on the current collector prior to assembly in the cell.

Although in the above tests, a niobium-doped titanium oxide was used, tantalum doping will also give the required electronic conductivity. More generally however, the operation of plasma-spraying, in which the oxide material becomes at least partially dissociated, results in the coating being electronically conductive even without doping.

Other plasma-sprayed electronically conductive oxide materials may also be employed instead of the titanium to give the required protection to the interstrate layer. These include strontium-doped lanthanum chromite, strontium titanate, lanthanum cobaltite, iron-doped calcium titanate and a mixture of aluminium oxide and titanium oxide.

Although in the above-described embodiments, the oxide coating is the outer layer on the cathode current collector in direct contact with the cathodic reactant, a further conductive layer, e.g. a vapour-deposited carbon layer, may be put over the oxide layer if so desired.

We claim:

1. In a sodium-sulphur cell having a solid electrolyte separating sodium forming an anode from a cathodic reactant comprising sulphur/polysulphides and having a cathode current collector electrically in contact with the cathodic reactant; wherein the improvement comprises a cathode current collector comprising an aluminum substrate, an interstrate layer over the surface of the substrate exposed to cathodic reactant and a coating of electronically conductive oxide material with respect to the cathodic reactant over the interstrate layer, said interstrate layer being of a nickel chromium alloy containing at least 10% by weight of nickel and at least 10% by weight of chromium, the combined nickel and chromium amounting to at least 50% by weight of the nickel-chromium alloy and the oxide coating being a plasma-sprayed or detonation-gun sprayed protective layer completely covering the interstrate layer.

2. A sodium-sulphur cell as claimed in claim 1 wherein the nickel-chromium alloy is a binary alloy of nickel and chromium.

3. A sodium-sulphur cell as claimed in claim 1 wherein the interstrate layer is a plasma-sprayed layer.

4. A sodium-sulphur cell as claimed in claim 1 wherein the oxide coating is a conductive titanium oxide coating.

5. A sodium-sulphur cell as claimed in claim 4 wherein the oxide coating is of titanium oxide doped with a metal ion of valency of 5.

6. A sodium-sulphur cell as claimed in claim 1 wherein the oxide coating is strontium-doped lanthanum chromite.

7. A sodium-sulphur cell as claimed in claim 1 wherein the oxide coating is strontium titanate.

8. A sodium-sulphur cell as claimed in claim 1 wherein the oxide coating is iron-doped calcium titanate.

9. A sodium-sulphur cell as claimed in claim 1 wherein the oxide coating is lanthanum cobaltite.

10. A sodium-sulphur cell as claimed in claim 1 wherein the oxide coating is a mixture of aluminium oxide and titanium dioxide.

11. In a sodium-sulphur cell having a solid electrolyte separating sodium forming an anode from a cathodic reactant comprising sulphur/polysulphides and having a cathode current collector electrically in contact with the cathodic reactant; wherein the improvement comprises a cathode current collector comprising an aluminum substrate, an interstrate layer over the surface of the substrate exposed to cathodic reactant and a coating of electronically conductive oxide material inert with respect to the cathodic reactant over the interstrate layer, said interstrate layer being of a nickel chromium alloy containing at least 10% by weight of nickel and at least 10% by weight of chromium, the combined nickel and chromium amounting to at least 50% by weight of the nickel-chromium alloy, the balance comprising substantially iron and/or cobalt, and the oxide coating being a plasma-sprayed or detonation-gun sprayed protective layer completely covering the interstrate layer.

12. A sodium sulphur cell as claimed in claim 11 wherein the conductive oxide material is titania.

13. A sodium-sulphur cell comprising a solid electrolyte tube separating sodium around the outside of the electrolyte tube from sulphur/polysulphides constituting the cathodic reactant inside the tube wherein a cathode current collector of elongate form is provided axially located inside the electrolyte tube, which cathode current collector is an aluminum rod or tube, an interstrate layer on the surface of the current collector exposed to the cathodic reactant, and a plasma-sprayed or detonation-gun sprayed conductive oxide coating over the interstrate layer, the interstrate layer being of a nickel-chromium alloy containing at least 10% by weight of Ni and at least 10% by weight of Cr, the combined nickel and chromium being at least 50% by weight of the total, the balance of said alloy being comprised mainly of iron and/or cobalt.

14. A sodium-sulphur cell as claimed in claim 13 wherein the conductive oxide is titanium oxide.

15. A sodium-sulphur cell as claimed in claim 13 wherein the conductive oxide is selected from the group consisting of strontium-doped lanthanum chromite, iron-doped calcium titanate, strontium titanate, and lanthanum cobaltite.

16. A sodium-sulphur cell as claimed in claim 13 wherein the conductive oxide is a mixture of aluminum oxide and titanium oxide.

17. A sodium-sulphur cell as claimed in claim 13 wherein the conductive oxide is niobium-doped or tantalum-doped titanium oxide.

18. In a sodium-sulphur cell having a solid electrolyte separating sodium forming an anode from a cathodic reactant comprising sulphur/polysulphides and having a cathode current collector electrically in contact with the cathodic reactant; wherein the improvement comprises a cathode current collector comprising an aluminum substrate, an interstrate layer over the surface of the substrate exposed to cathodic reactant and a coating of electronically conductive oxide material inert with respect to the cathodic reactant over the interstrate layer, said interstrate layer comprising a nickel chromium alloy consisting of at least 10% by weight of nickel and at least 10% by weight of chromium, and the oxide coating being a plasma-sprayed or detonation-gun sprayed protective layer completely covering the interstrate layer.

19. A sodium-sulphur cell comprising a solid electrolyte tube separating sodium around the outside of the electrolyte tube from sulphur/polysulphides constituting the cathodic reactant inside the tube wherein a cathode current collector of elongate form is provided axially located inside the electrolyte tube, which cathode current collector is an aluminum rod or tube, an interstrate layer on the surface of the current collector exposed to the cathodic reactant, and a plasma-sprayed or detonation-gun sprayed conductive oxide coating over the interstrate layer, the interstrate layer comprising a nickel-chromium alloy consisting of at least 10% by weight of Ni and at least 10% by weight of Cr.

20. A sodium-sulphur cell comprising a solid electrolyte tube separating sodium around the outside of the electrolyte tube from sulphur/polysulphides constituting the cathodic reactant inside the tube wherein a cathode current collector of elongated form is provided axially located inside the electrolyte tube, which cathode current collector is an aluminum rod or tube, an interstrate layer on the surface of the current collector exposed to the cathodic reactant, and a plasma-sprayed or detonation-gun sprayed conductive oxide coating over the interstrate layer, the interstrate layer being a nickel-chromium alloy containing at least 10% by weight of Ni and at least 10% by weight of Cr, the combined nickel and chromium being at least 50% by weight of the total, not more than 5% by weight of at least one element selected from the group consisting of molybdenum, tungsten, niobium, aluminum, titanium, manganese, carbon and yttrium, and the balance being comprised mainly of iron and/or cobalt.

* * * * *